(12) United States Patent
Song (10) Patent No.: US 11,915,125 B2
(45) Date of Patent: Feb. 27, 2024

(54) ARITHMETIC DEVICES FOR NEURAL NETWORK

(71) Applicant: SK hynix Inc., Icheon-si (KR)

(72) Inventor: Choung Ki Song, Yongin-si (KR)

(73) Assignee: SK hynix Inc., Icheon-si (KR)

(*) Notice: Subject to any disclaimer, the term of this patent is extended or adjusted under 35 U.S.C. 154(b) by 854 days.

(21) Appl. No.: 16/919,786

(22) Filed: Jul. 2, 2020

(65) Prior Publication Data

US 2021/0133545 A1 May 6, 2021

Related U.S. Application Data

(60) Provisional application No. 62/959,593, filed on Jan. 10, 2020, provisional application No. 62/959,574, filed on Jan. 10, 2020, provisional application No. 62/958,609, filed on Jan. 8, 2020, provisional application No. 62/958,614, filed on Jan. 8, 2020.

(30) Foreign Application Priority Data

Oct. 31, 2019 (KR) .................. 10-2019-0138114

(51) Int. Cl.
*G06N 3/06* (2006.01)
*G06F 7/544* (2006.01)
*G06N 3/048* (2023.01)
*G06N 3/063* (2023.01)

(52) U.S. Cl.
CPC ............ *G06N 3/063* (2013.01); *G06F 7/5443* (2013.01); *G06N 3/048* (2023.01)

(58) Field of Classification Search
CPC ........ G06F 1/03; G06F 2207/4824; G06F 7/50; G06F 7/523; G06F 7/5443; G06N 3/048; G06N 3/063
See application file for complete search history.

(56) References Cited

U.S. PATENT DOCUMENTS 5,181,184 A   1/1993  Shim et al.
5,434,819 A   7/1995  Matsuo et al.
(Continued)

FOREIGN PATENT DOCUMENTS

CN   108736876 A   11/2018
CN   109964209 A    7/2019
(Continued)

OTHER PUBLICATIONS

Coric et al., "A Neural Network FPGA Implementation", Aug., 6, 2002, Proceedings of the 5th Seminar on Neural Network Applications in Electrical Engineering. NEUREL 2000 (IEEE Cat. No.00EX287), pp. 117-120, University of Belgrade, Yugoslavia.

*Primary Examiner* — Brent Johnston Hoover
(74) *Attorney, Agent, or Firm* — William Park & Associates Ltd.

(57) ABSTRACT

An arithmetic device includes an AF circuit including a first table storage circuit. The AF circuit stores a table input signal into one variable latch selected based on an input selection signal among variable latches included in the first table storage circuit in a look-up table form when a table set signal is activated. The AF circuit extracts a result value of a first activation function realized by a look-up table based on an input distribution signal to output the extracted result value as a fist table output signal for generating an output distribution signal.

20 Claims, 9 Drawing Sheets

(56) References Cited

U.S. PATENT DOCUMENTS

| | | | |
|---|---|---|---|
| 5,544,098 A | 8/1996 | Matsuo et al. | |
| 5,715,203 A | 2/1998 | Uchida | |
| 5,768,617 A | 6/1998 | Liu | |
| 6,414,687 B1 * | 7/2002 | Gibson | G06F 9/3897 |
| | | | 712/E9.067 |
| 6,879,540 B2 | 4/2005 | Maruyama et al. | |
| 7,333,372 B2 | 2/2008 | Tanaka et al. | |
| 7,913,013 B2 | 3/2011 | Oikawa | |
| RE42,643 E | 8/2011 | Oshima et al. | |
| 9,007,849 B2 | 4/2015 | Song | |
| 9,559,836 B1 | 1/2017 | Hata | |
| 10,592,247 B2 * | 3/2020 | Tanaka | G06F 9/30145 |
| 11,062,202 B2 | 7/2021 | James et al. | |
| 2009/0046527 A1 | 2/2009 | Ko | |
| 2013/0041859 A1 | 2/2013 | Esterlilne et al. | |
| 2014/0067889 A1 | 3/2014 | Mortensen et al. | |
| 2014/0376676 A1 | 12/2014 | Schafferer | |
| 2017/0365306 A1 | 12/2017 | Ouyang et al. | |
| 2018/0136844 A1 | 5/2018 | Kim | |
| 2018/0373977 A1 | 12/2018 | Carbon et al. | |
| 2019/0042922 A1 | 2/2019 | Pillai et al. | |
| 2019/0080223 A1 | 3/2019 | Fraser et al. | |
| 2019/0147323 A1 | 5/2019 | Li et al. | |
| 2019/0149315 A1 | 5/2019 | Suzuki et al. | |
| 2020/0019847 A1 | 1/2020 | Krishnamurthy et al. | |
| 2021/0132910 A1 | 5/2021 | Lee et al. | |
| 2021/0132911 A1 | 5/2021 | Song | |
| 2021/0132953 A1 | 5/2021 | Song | |
| 2021/0132954 A1 | 5/2021 | Song | |
| 2021/0133545 A1 | 5/2021 | Song | |
| 2021/0133546 A1 | 5/2021 | Song | |
| 2021/0134349 A1 | 5/2021 | Song | |
| 2021/0158134 A1 | 5/2021 | Song | |
| 2021/0158852 A1 | 5/2021 | Song | |
| 2021/0365241 A1 | 11/2021 | Huang et al. | |
| 2022/0276837 A1 | 9/2022 | Fujinami | |

FOREIGN PATENT DOCUMENTS

| | | |
|---|---|---|
| CN | 110009092 A | 7/2019 |
| CN | 110060714 A | 7/2019 |
| CN | 112749794 A | 5/2021 |
| DE | 19942144 A1 | 6/2001 |
| EP | 0575716 A1 | 12/1993 |
| GB | 2234374 A | 1/1991 |
| JP | 2003059268 A | 2/2003 |
| JP | 2010050609 A | 3/2010 |
| KR | 1020180053314 A | 5/2018 |
| KR | 20180070187 A | 6/2018 |
| KR | 1020190054454 A | 5/2019 |
| KR | 102032146 B1 | 10/2019 |
| KR | 1020190116024 A | 10/2019 |
| KR | 20220111591 A | 8/2022 |

* cited by examiner

ARITHMETIC DEVICES FOR NEURAL NETWORK

CROSS-REFERENCE TO RELATED APPLICATIONS

The present application claims priority under 35 U.S.C. 119(a) to Korean Application No. 10-2019-0138114, filed on Oct. 31, 2019, Provisional Patent Application No. 62/958,614, filed on Jan. 8, 2020, Provisional Patent Application No. 62/958,609, filed on Jan. 8, 2020, Provisional Patent Application No. 62/959,574, filed on Jan. 10, 2020, and Provisional Patent Application No. 62/959,593, filed on Jan. 10, 2020, which is incorporated herein by reference in its entirety.

BACKGROUND

1. Technical Field

Embodiments of the present disclosure generally relate to arithmetic devices for a neural network.

2. Related Art

In a neural network, neurons mathematically modelled to resemble to a human brain are connected to each other to form a network, Recently, neural network technologies have been developed fast. Accordingly, a lot of effort has been focused on analyzing input data and extracting useful information using the neural network technologies in various electronic devices.

SUMMARY

According to an embodiment, an arithmetic device may include a command decoder and an AF circuit. The command decoder decodes an external command to generate a table set signal, an input selection signal, and a table input signal. The AF circuit may include a first table storage circuit. The AF circuit stores the table input signal into one variable latch selected based on the input selection signal among a plurality of variable latches included in the first table storage circuit in a look-up table form when the table set signal is activated. The AF circuit extracts a result value of a first activation function realized by the look-up table based on an input distribution signal to output the extracted result value as a fist table output signal for generating an output distribution signal.

According to another embodiment, an arithmetic device may include an external data decoder and an AF circuit. The external data decoder decodes external data to generate a table set signal, an input selection signal, and a table input signal. The AF circuit may include a first table storage circuit. The AF circuit stores the table input signal into one variable latch selected based on the input selection signal among a plurality of variable latches included in the first table storage circuit in a look-up table form when the table set signal is activated. The AF circuit extracts a result value of a first activation function realized by the look-up table based on an input distribution signal to output the extracted result value as a fist table output signal for generating an output distribution signal.

According to yet another embodiment, an arithmetic device may include a mode register and an AF circuit. The mode register stores a table set signal, an input selection signal, and a table input signal through a mode register set. The AF circuit may include a first table storage circuit. The AF circuit stores the table input signal into one variable latch selected based on the input selection signal among a plurality of variable latches included in the first table storage circuit in a look-up table form when the table set signal is activated. The AF circuit extracts a result value of a first activation function realized by the look-up table based on an input distribution signal to output the extracted result value as a fist table output signal for generating an output distribution signal.

DETAILED DESCRIPTION

Various embodiments of the present disclosure will be described hereinafter with reference to the accompanying drawings. However, the embodiments described herein are for illustrative purposes only and are not intended to limit the scope of the present disclosure.

Figure 1:
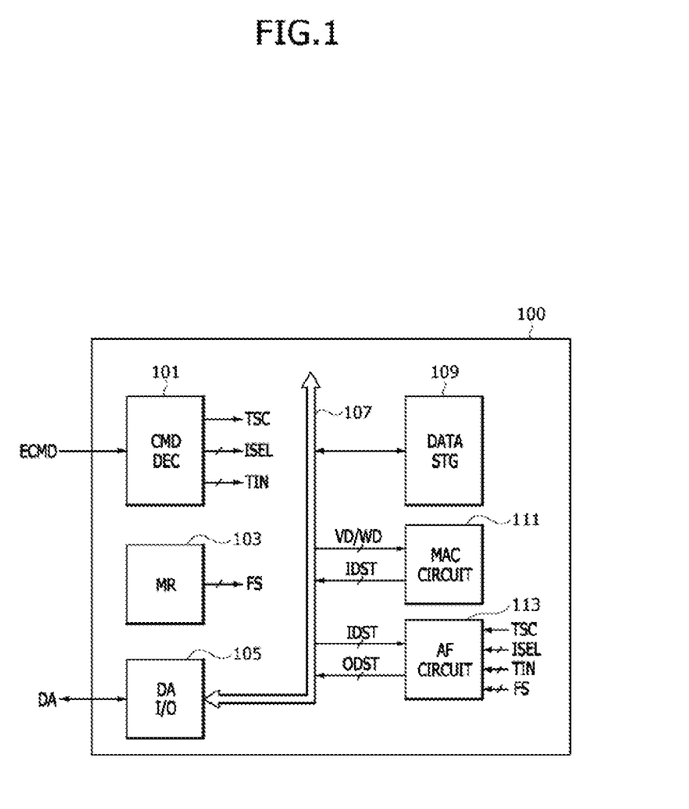
FIG. 1 is a block diagram illustrating a configuration of an arithmetic device according to an embodiment of the present disclosure.

As illustrated in FIG. 1, an arithmetic device 13 may include a command decoder 101, a mode register 103, a data input/output circuit 105, a data line 107, a data storage circuit 109, a MAC circuit 111 and an AF circuit 113.

The command decoder 101 may generate a table set signal TSC, an input selection signal ISEL, and a table input signal TIN based on an external command ECMD. The number of bits included in the input selection signal ISEL may be set to be different according to the embodiments. The number of bits included in the table input signal TIN may be set to be different according to the embodiments.

The command decoder 101 may decode external command ECMD to generate the table set signal TSC. The table set signal TSC may be activated to store an activation function used for a neural network into a first table storage circuit (133 of FIG. 3) in a look-up table form. The number of bits included in the external command ECMD for activating the table set signal TSC may be set to be different according to the embodiments. In addition, a logic level combination of the external command ECMD for activating the table set signal TSC may be set to be different according to the embodiments. The lookup table has a table form that contains information about an input value and the output value corresponding to the input value. When using the lookup table, the output value corresponding to the input value can be printed directly without any arithmetic, thus improving the arithmetic speed.

The command decoder 101 may decode the external command ECMD to generate the input selection signal ISEL and the table input signal TIN. The input selection signal ISEL and the table input signal TIN may be generated to store the activation function into first to $N^{th}$ variable latches (149_1~149_N of FIG. 4) included in the first table storage circuit (133 of FIG. 3) in a look-up table form. The table input signal TIN may be stored into one variable latch selected by the input selection signal ISEL among the first to $N^{th}$ variable latches (149_1~149_N of FIG. 4). A logic level combination of the external command ECMD for setting logic level combinations of the table input signal TIN may be set to be different according to the embodiments. A logic level combination of the external command ECMD for setting logic level combinations of the input selection signal ISEL may be set to be different according to the embodiments.

The mode register 103 may store a function selection signal FS through a mode register set. The mode register 103 may output the function selection signal FS through a mode register read. The mode register set and the mode register read are common operations for the mode register 139, so the specific description is omitted. The mode register 103 may apply the function selection signal FS to the AF circuit 113. The function selection signal FS may be generated to select one of various activation functions which are used for a neural network. The various activation functions used for a neural network may include, but are not limited to, sigmoid (i.e., sigmoid function), Tanh (i.e., hyperbolic tangent activation function), ReLU (i.e., rectified linear unit function), leaky ReLU (i.e., leaky rectified linear unit function), Maxout (i.e., max out activation function), and an activation function which is inputted based on the external command ECMD. The number of bits included in the function selection signal FS may be set to be different according to the embodiments. The mode register 103 can be located on the external side of the arithmetic device 13, for example, on a host or a memory controller.

The data input/output circuit 105 may receive external data DA from the external side of the arithmetic device 13, and transmit the external data DA to at least one of the data storage circuit 109 and the MAC circuit 111 through the data line 107. The data input/output circuit 105 may output data from at least one of the data storage circuit 109, the MAC circuit 111 and the AF circuit 113 through the data line 107 to the external data DA.

The data storage circuit 109 may be stored internally by receiving the external data DA received from the data input/output circuit 105 through the data line 107 in a write operation. The data storage circuit 109 may transmit the data stored internally to the data input/output circuit 105 through the data line 107 and output it to the external data DA in read operation.

The MAC circuit 111 may receive vector data VD and weight data WD. The MAC circuit 111 may receive the vector data VD from the data input/output circuit 105 or data storage circuit 109. The MAC circuit 111 may receive the weight data WD from the data input/output circuit 105 or data storage circuit 109. The MAC circuit 111 may perform MAC arithmetic operation on the vector data VD and the weight data WD, and generate an input distribution signal IDST based on the results of MAC arithmetic operation.

The MAC arithmetic operation may include a multiplying operation and an accumulating operation for the vector data VD and the weight data WD. When the vector data VD and the weight data WD are implemented in matrix format, the MAC arithmetic operations may include multiple multiplying operations and multiple accumulating operations for elements contained in matrix with the vector data VD implemented and elements contained in matrix with the weight data WD implemented. In the neural network, the MAC arithmetic operations are performed to classify features contained in an input layer into resulting values contained in an output layer. The vector data VD may contain information about features contained in the Input layer. The weight data WD may contain information about the influence on classifying features of the input layers as results contained in the output layers. The MAC circuit 111 may receive an output distribution signal ODST from the AF circuit 113 as the vector data VD when multiple layers are applied in perceptron.

The AF circuit 113 may store the activation functions used for a neural network into the first table storage circuit (133 of FIG. 3) in a look-up table form, based on the table set signal TSC, the input selection signal ISEL, and the table input signal TIN. The lookup table stored in the AF circuit 113 includes information on the relationship between the input distribution signal IDST and the output distribution signal ODST. The output distribution signal ODST can be defined as the value derived when the input distribution signal IDST is applied to an activation function. The AF circuit 113 may store the table input signal TIN into one variable latch selected by the input selection signal ISEL among the first to $N^{th}$ variable latches (149_1~149_N of FIG. 4) when the table set signal TSC is activated. Various activation functions used for a neural network, for example, sigmoid, Tanh, ReLU, leaky ReLU, and Maxout may be hardwired into the AF circuit 113. The number of the activation functions hardwired in the AF circuit 113 may be set to be different according to the embodiments.

The AF circuit 113 may select one of the various activation functions based on the function selection signal FS. The AF circuit 113 may generate a result value provided by an activation function selected by the function selection signal FS based on the input distribution signal IDST. The AF circuit 113 may extract a result value corresponding to the input distribution signal IDST from a look-up table to which an activation function selected by the function selection signal FS is applied, thereby outputting the result value as an output distribution signal ODST. A configuration and an operation of the AF circuit 113 will be described with reference to FIGS. 3 to 7.

Figure 2:
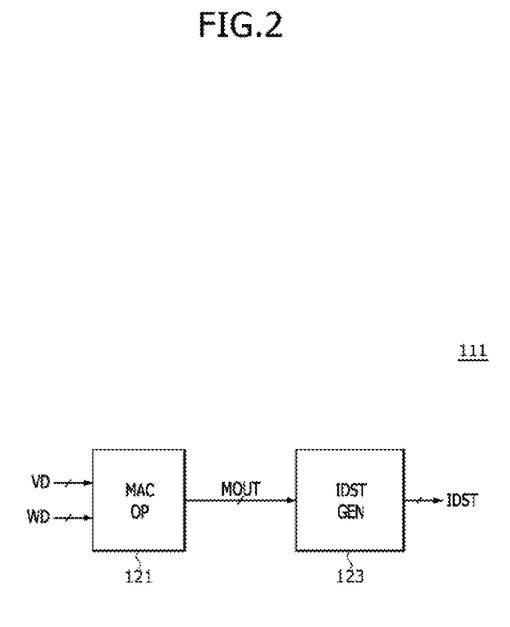
FIG. 2 is a block diagram illustrating a configuration of MAC circuit included in the arithmetic device of FIG. 1.

Referring to FIG. 2, the MAC circuit 111 may include a MAC operator 121 and an input distribution signal generation circuit 123. The MAC operator 121 may receive the vector data VD and the weight data WD and may perform the MAC arithmetic operation including a multiplying operation and an accumulating operation to generate an arithmetic result signal MOUT. The input distribution signal generation circuit 123 may extract only some bits among bits of the arithmetic result signal MOUT to generate the input distribution signal IDST. For example, when the arithmetic result signal MOUT contains bits corresponding to the integer and bits corresponding to the decimal part, the input distribution signal IDST can be selected as the bits corresponding to the integer from among the bits contained in the arithmetic result signal MOUT. The number of bits of the arithmetic result signal MOUT may be set to be different according to the embodiments. In addition, the number of bits of the input distribution signal IDST may also be set to be different according to the embodiments. The number of bits of the input distribution signal IDST may be set to be less than the number of bits of the arithmetic result signal MOUT.

Figure 3:
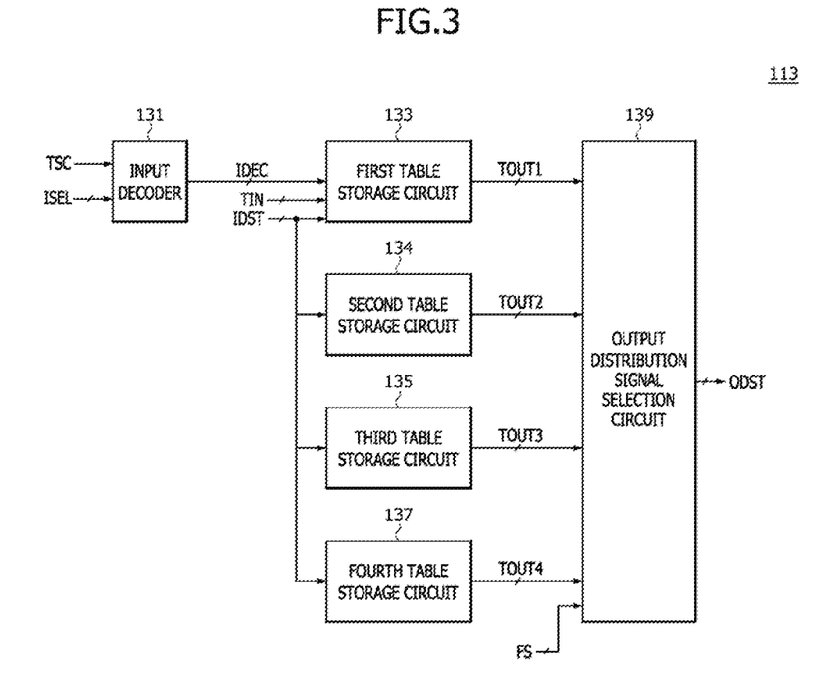
FIG. 3 is a block diagram illustrating a configuration of an AF circuit included in the arithmetic device of FIG. 1.

Referring to FIG. 3, the AF circuit 113 may include an input decoder 131, the first table storage circuit 133, a second table storage circuit 134, a third table storage circuit 135, a fourth table storage circuit 137, and an output distribution signal selection circuit 139.

The input decoder 131 may generate a decoded input signal IDEC based on the table set signal TSC and the input selection signal ISEL. The input decoder 131 may decode the input selection signal ISEL to generate the decoded input signal IDEC when the table set signal TSC is activated.

The first table storage circuit 133 may store the table input signal TIN and may output a first table output signal TOUT1, based on the decoded input signal IDEC and the input distribution signal IDST. The first table storage circuit 133 may store the table input signal TIN as a first activation function having a look-up table form based on the decoded input signal IDEC. The first table storage circuit 133 may output a result value of the first activation function as the first table output signal TOUT1 based on the input distribution signal IDST. A configuration and an operation of the first table storage circuit 133 will be described with reference to FIGS. 4 to 6.

A second activation function may be hardwired into the second table storage circuit 134. The second table storage circuit 134 may include logic circuits implemented in hardware with the second activation function. The second activation function may be set as one of sigmoid, Tanh, ReLU, leaky ReLU, and Maxout. The second table storage circuit 134 may output a result value of the second activation function stored in a look-up table form as a second table output signal TOUT2 based on the input distribution signal IDST. A configuration and an operation of the second table storage circuit 134 will be described with reference to FIG. 7.

A third activation function may be hardwired into the third table storage circuit 135. The third table storage circuit 135 may include logic circuits implemented in hardware with the third activation function. The third activation function may be set as one of sigmoid, Tanh, ReLU, leaky ReLU, and Maxout. The third activation function may be set to be different from the second activation function. The third table storage circuit 135 may output a result value of the third activation function stored in a look-up table form as a third table output signal TOUT3 based on the input distribution signal IDST.

A fourth activation function may be hardwired into the fourth table storage circuit 137. The fourth table storage circuit 137 may include logic circuits implemented in hardware with the fourth activation function. The fourth activation function may be set as one of sigmoid, Tanh, ReLU, leaky ReLU, and Maxout. The fourth activation function may be set to be different from the second and third activation functions. The fourth table storage circuit 137 may output a result value of the fourth activation function stored in a look-up table form as a fourth table output signal TOUT4 based on the input distribution signal IDST.

The output distribution signal selection circuit 139 may generate the output distribution signal ODST from the first table output signal TOUT1, the second table output signal TOUT2, the third table output signal TOUT3, and the fourth table output signal TOUT4 based on the function selection signal FS. The output distribution signal selection circuit 139 may output the first table output signal TOUT1 as the output distribution signal ODST when the function selection signal FS has a first logic level combination. The output distribution signal selection circuit 139 may output the second table output signal TOUT2 as the output distribution signal ODST when the function selection signal FS has a second logic level combination. The output distribution signal selection circuit 139 may output the third table output signal TOUT3 as the output distribution signal ODST when the function selection signal FS has a third logic level combination. The output distribution signal selection circuit 139 may output the fourth table output signal TOUT4 as the output distribution signal ODST when the function selection signal FS has a fourth logic level combination.

Figure 4:
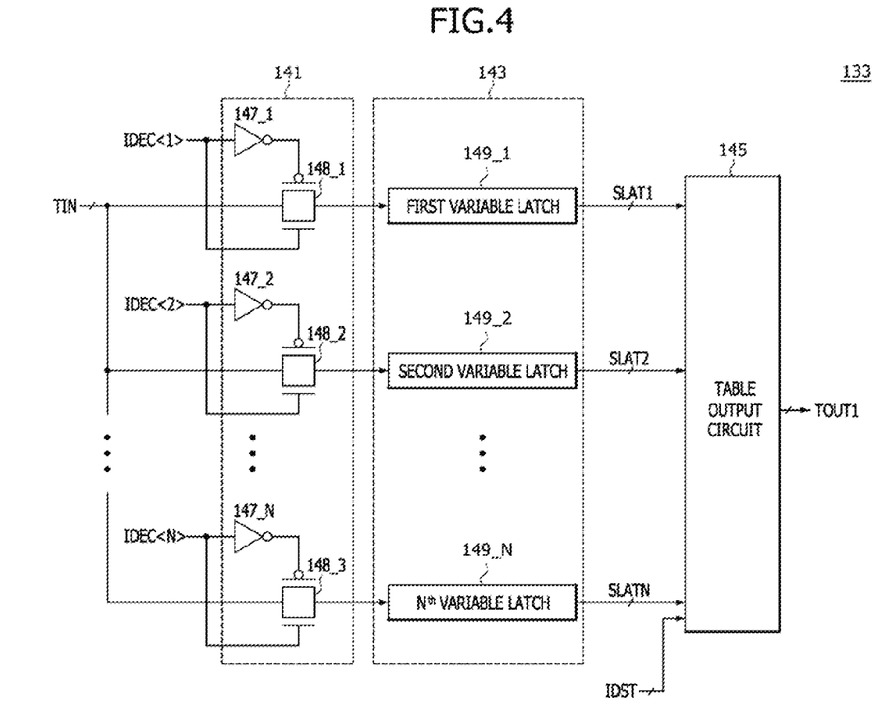
FIG. 4 illustrates a configuration of a first table storage circuit included in the AF circuit of FIG. 3.

Referring to FIG. 4, the first table storage circuit 133 may include a decoded signal input circuit 141, a variable latch circuit 143, and a table output circuit 145.

The decoded signal input circuit 141 may include inverters 147_1~147_N and transfer gates 148_1~148_N. The inverter 147_1 may inversely buffer a first bit signal of the decoded input signal IDEC<1> to output the inversely buffered signal of the first bit signal of the decoded input signal IDEC<1>. The inverter 147_2 may inversely buffer a second bit signal of the decoded input signal IDEC<2> to output the inversely buffered signal of the second bit signal of the decoded input signal IDEC<2>. The inverter 147_N may inversely buffer an $N^{th}$ bit signal of the decoded input signal IDEC<N> to output the inversely buffered signal of the $N^L$ bit signal of the decoded input signal IDEC<N>. The transfer gate 148_1 may be turned on to transfer the table input signal TIN to a first variable latch 149_1 when the first bit signal of the decoded input signal IDEC<1> has a logic "high" level. The transfer gate 148_2 may be turned on to transfer the table input signal TIN to a second variable latch 149_2 when the second bit signal of the decoded input signal IDEC<2> has a logic "high" level. The transfer gate 148_N may be turned on to transfer the table input signal TIN to an $N^{th}$ variable latch 149_N when the $N^{th}$ bit signal of the decoded input signal IDEC<N> has a logic "high" level.

The decoded signal input circuit 141 may transfer the table input signal TIN to the first to $N^{th}$ variable latches 149_1~149_N included in the variable latch circuit 143 based on the decoded input signal IDEC. The decoded signal input circuit 141 may receive the table input signal TIN through a path selected by the decoded input signal IDEC to transfer the table input signal TIN to the first to $N^{th}$ variable latches 149_1~149_N included in the variable latch circuit 143.

The variable latch circuit 143 may include the first to $N^{th}$ variable latches 149_1~149_N. The first variable latch 149_1 may receive and store the table input signal TIN through the transfer gate 148_1 turned on when the first bit signal IDEC<1> of the decoded input signal IDEC has a logic "high" level and may output the stored table input signal TIN as a first variable latch signal SLAT1. The second variable latch 149_2 may receive and store the table input signal TIN through the transfer gate 148_2 turned on when the second bit signal IDEC<2> of the decoded input signal IDEC has a logic "high" level and may output the stored table input signal TIN as a second variable latch signal SLAT2. The $N^{th}$ variable latch 149_N may receive and store the table input signal TIN through the transfer gate 148_N turned on when the $N^{th}$ bit signal IDEC<N> of the decoded input signal IDEC has a logic "high" level and may output the stored table input signal TIN as an $N^{th}$ variable latch signal SLATN.

The table output circuit 145 may select one of the first to $N^{th}$ variable latch signals SLAT1~SLATN as a result value of the activation function based on the input distribution signal IDST, thereby outputting the selected variable latch signal as the first table output signal TOUT1. The table output circuit 145 may be realized to select one of the first to $N^{th}$ variable latch signals SLAT1~SLATN as the first table output signal TOUT1 according to a logic level combination of the input distribution signal IDST or according to a decoded signal of the input distribution signal IDST. A configuration and an operation of the table output circuit 145 will be described with reference to FIGS. 5 and 6.

Figure 5:
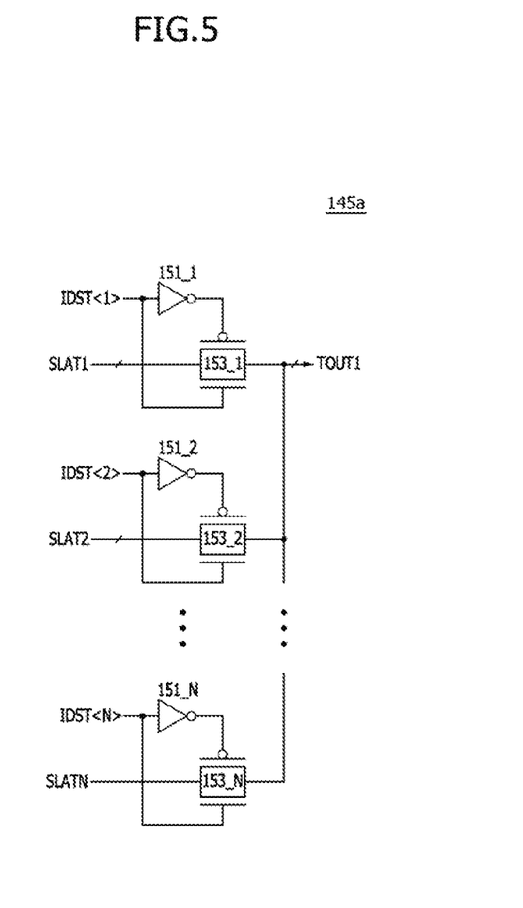
FIGS. 5 and 6 are circuit diagrams illustrating examples of a table output circuit included in the first table storage circuit of FIG. 4.

Referring to FIG. 5, a table output circuit 145a corresponding to an example of the table output circuit 145 may include inverters 151_1, 151_2, . . . , and 151_N and transfer gates 153_1, 153_2, . . . , and 153_N. The inverter 151_1 may inversely buffer a first bit signal of the input distribution signal IDST<1> to output the inversely buffered signal of the first bit signal of the input distribution signal IDST<1>. The inverter 151_2 may inversely buffer a second bit signal of the input distribution signal IDST<2> to output the inversely buffered signal of the second bit signal of the input distribution signal IDST<2>. The inverter 151_N may inversely buffer an $N^{th}$ bit signal of the input distribution signal IDST<N> to output the inversely buffered signal of the $N^{th}$ bit signal of the input distribution signal IDST<N>. The transfer gate 153_1 may be turned on to output the first variable latch signal SLAT1 as the first table output signal TOUT1 when the first bit signal of the input distribution signal IDST<1> has a logic "high" level. The transfer gate 153_2 may be turned on to output the second variable latch signal SLAT2 as the first table output signal TOUT1 when the second bit signal of the input distribution signal IDST<2> has a logic "high" level. The transfer gate 153_N may be turned on to output the $N^{th}$ variable latch signal SLATN as the first table output signal TOUT1 when the $N^{th}$ bit signal of the input distribution signal IDST<N> has a logic "high" level.

Figure 6:
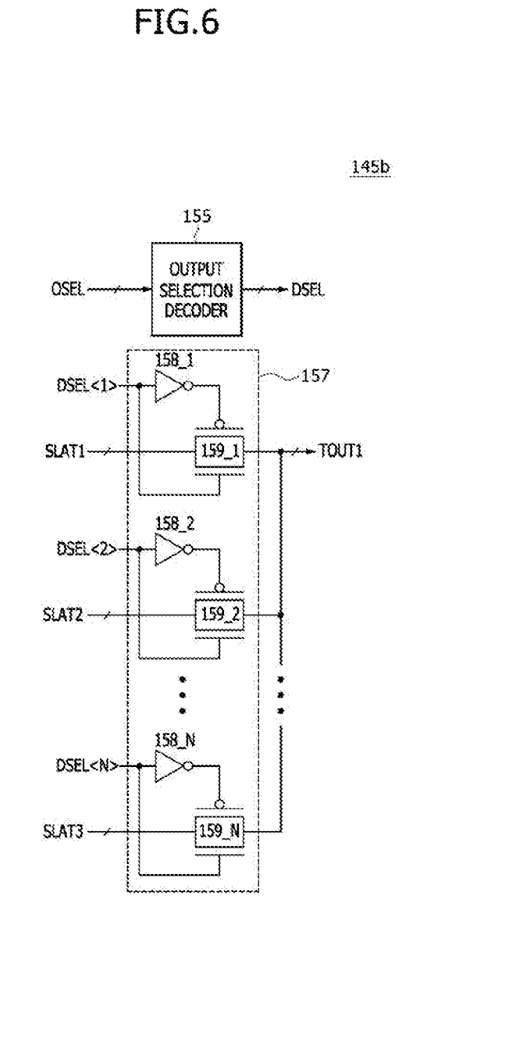

Referring to FIG. 6, a table output circuit 145b corresponding to another example of the table output circuit 145 may include an output selection decoder 155 and a decoded signal output circuit 157. The output selection decoder 155 may decode the input distribution signal IDST to generate a decoded selection signal DSEL. The decoded signal output circuit 157 may include inverters 158_1, 158_2, . . . , and 158_N and transfer gates 159_1, 159_2, . . . , and 159_N. The inverter 158_1 may inversely buffer a first bit signal of the decoded selection signal DSEL<1> to output the inversely buffered signal of the first bit signal of the decoded selection signal DSEL<1>. The inverter 158_2 may inversely buffer a second bit signal of the decoded selection signal DSEL<2> to output the inversely buffered signal of the second bit signal of the decoded selection signal DSEL<2>. The inverter 158_N may inversely buffer an $N^{th}$ bit signal of the decoded selection signal DSEL<N> to output the inversely buffered signal of the $N^{th}$ bit signal of the decoded selection signal DSEL<N>. The transfer gate 159_1 may be turned on to output the first variable latch signal SLAT1 as the first table output signal TOUT1 when the first bit signal of the decoded selection signal DSEL<1> has a logic "high" level. The transfer gate 159_2 may be turned on to output the second variable latch signal SLAT2 as the first table output signal TOUT1 when the second bit signal of the decoded selection signal DSEL<2> has a logic "high" level. The transfer gate 159_N may be turned on to output the $N^{th}$ variable latch signal SLATN as the first table output signal TOUT1 when the $N^{th}$ bit signal of the decoded selection signal DSEL<N> has a logic "high" level.

Figure 7:
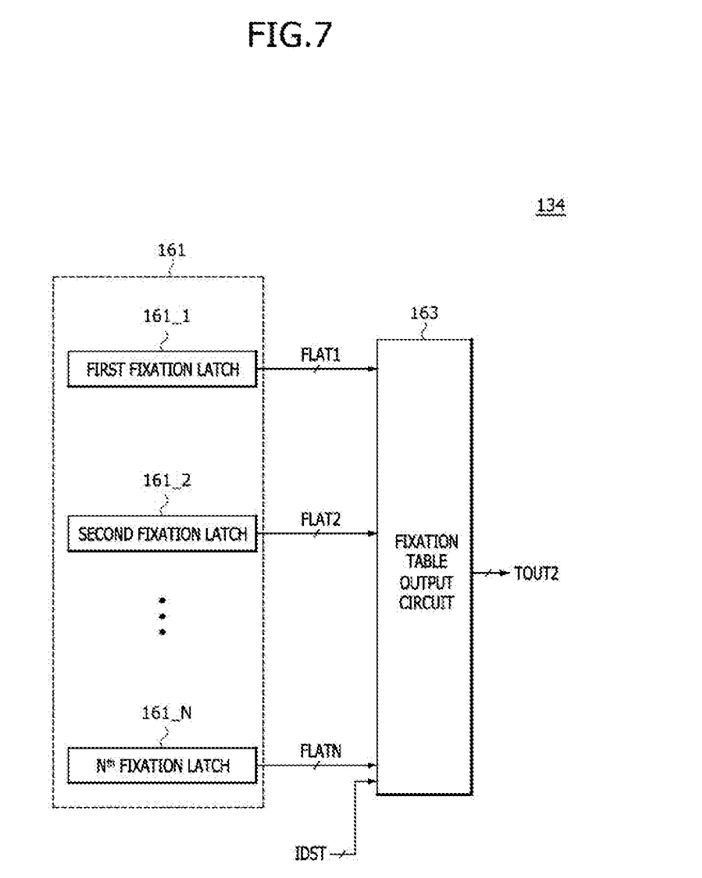
FIG. 7 is a block diagram illustrating a configuration of a second table storage circuit included in the AF circuit of FIG. 3.

Referring to FIG. 7, the second table storage circuit 134 may include a fixation latch circuit 161 and a fixation table output circuit 163. The fixation latch circuit 161 may include first to $N^{th}$ fixation latches 161_1~161_N. A first fixation latch signal FLAT1 may be hardwired in the first fixation latch 161_1 as a hardware. A second fixation latch signal FLAT2 may be hardwired in the second fixation latch 161_2 as a hardware. An $N^{th}$ fixation latch signal FLATN may be hardwired in the $N^{th}$ fixation latch 161_N as a hardware. Each of the first to $N^{th}$ fixation latch signals FLAT1"FLATN stored in the first to $N^{th}$ fixation latches 161_1-161_N may be a result value for storing one of sigmoid, Tanh, ReLU, leaky ReLU, and Maxout in a look-up table form. Logic level combinations of the input distribution signal IDST may be set to correspond to the first to $N^{th}$ fixation latch signals FLAT1_FLATN, respectively. The fixation table output circuit 163 may select one of the first to $N^{th}$ fixation latch signals FLAT1_FLATN as a result value of the activation function based on the input distribution signal IDST, thereby outputting the selected variable latch signal as the second table output signal TOUT2. Each of the third and fourth table storage circuits 25 and 26 illustrated in FIG. 3 may be realized to have the same configuration as the second table storage circuit 134 illustrated in FIG. 7.

The arithmetic device 100 having an aforementioned configuration may receive information on the activation function used for a neural network as a command and an address to store the information in a look-up table form. Thus, various activation functions set to be different from each other may be applied to the neural network without any design changes.

Figure 8:
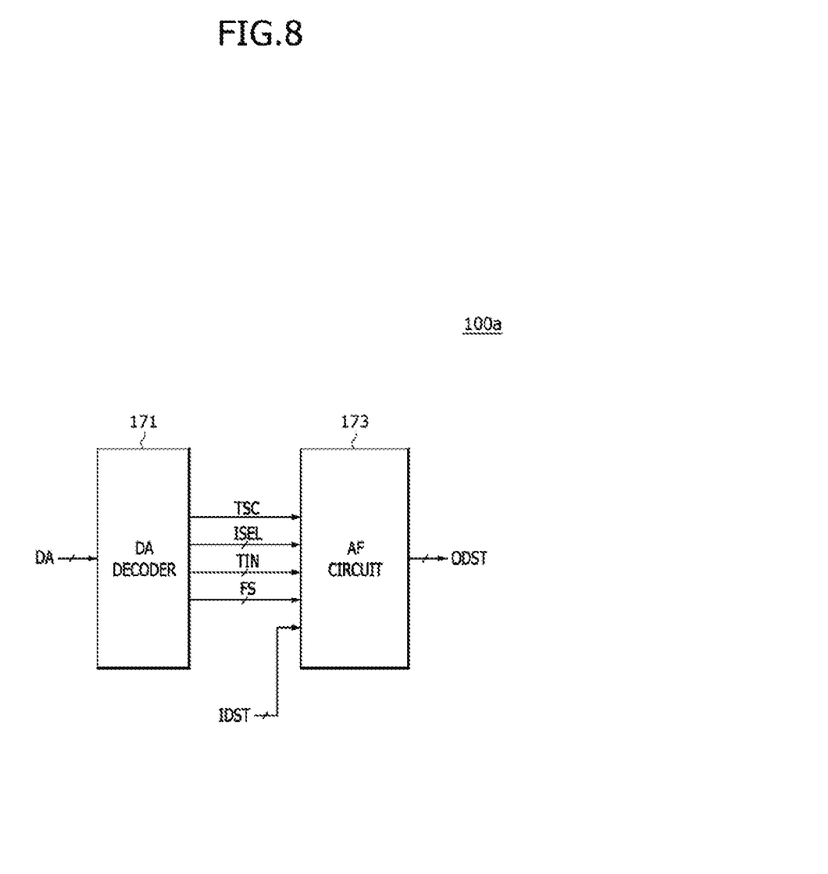
FIG. 8 is a block diagram illustrating a configuration of an arithmetic device according to another embodiment of the present disclosure.

Referring to FIG. 8, an arithmetic device 100a according to another embodiment may include an external data decoder 171 and an AF circuit 173.

The external data decoder 171 may receive external data DA to set and output a table set signal TSC, an input selection signal ISEL, a table input signal TIN, and a function selection signal FS. The external data decoder 171 may generate the table set signal TSC, the input selection signal ISEL, the table input signal TIN, and the function selection signal FS from the external data DA which are sequentially inputted to the external data decoder 171.

The AF circuit 173 may store activation functions used for a neural network in a look-up table form, based on the table set signal TSC, the input selection signal ISEL, and the table input signal TIN. Various activation functions may be hardwired in the AF circuit 173. The AF circuit 173 may output a result value of an activation function, which is selected by the function selection signal FS based on an input distribution signal IDST, as an output distribution signal ODST. A configuration and an operation of the AF circuit 173 may be the same as a configuration and an operation of the AF circuit 113 illustrated in FIG. 1. Thus, descriptions of the AF circuit 173 will be omitted hereinafter.

The arithmetic device 100a having the aforementioned configurations may receive information on the activation function used for a neural network as data to store the information in a look-up table form. Thus, various activation functions set to be different from each other may be applied to the neural network without any design changes.

Figure 9:
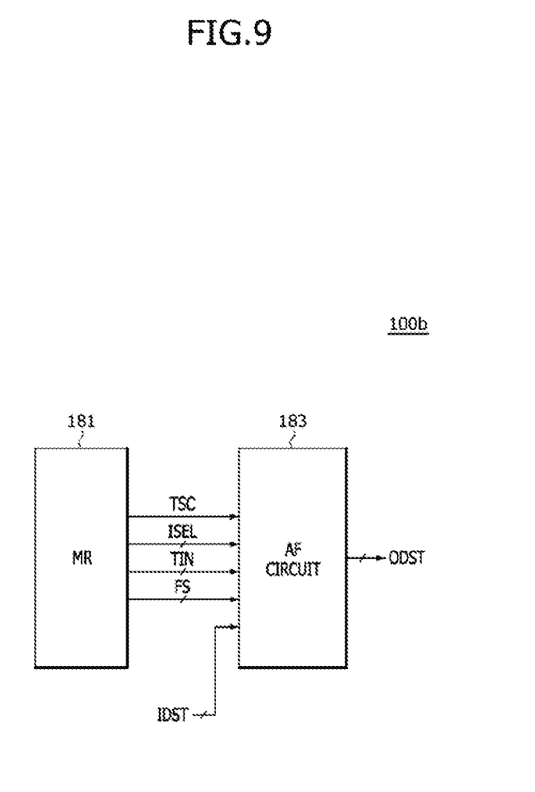
FIG. 9 is a block diagram illustrating a configuration of an arithmetic device according to still another embodiment of the present disclosure.

Referring to FIG. 9, an arithmetic device 100b according to still another embodiment may include a mode register 181 and an AF circuit 183.

The mode register 181 may store a table set signal TSC, an input selection signal ISEL, a table input signal TIN, and a function selection signal FS through a mode register set. The mode register 181 may output the table set signal TSC, the input selection signal ISEL, the table input signal TIN, and the function selection signal FS through a mode register read.

The AF circuit 183 may store activation functions used for a neural network in a look-up table form, based on the table set signal TSC, the input selection signal ISEL, and the table input signal TIN. Various activation functions may be hardwired in the AF circuit 183. The AF circuit 183 may output a result value of an activation function, which is selected by the function selection signal FS based on an input distribution signal IDST, as an output distribution signal ODST. A configuration and an operation of the AF circuit 183 may be the same as a configuration and an operation of the AF circuit 113 illustrated in FIG. 1. Thus, descriptions of the AF circuit 183 will be omitted hereinafter.

The arithmetic device 100b having the aforementioned configurations may store information on the activation function used for a neural network in a look-up table form based on information stored in the mode register 181. Thus, various activation functions set to be different from each other may be applied to the neural network without any design changes.

The arithmetic device 100 illustrated in FIG. 1, the arithmetic device 100a illustrated in FIG. 8, and the arithmetic device 100b illustrated in FIG. 9 can be included in memory modules that receive the external command through hosts and memory controllers. Memory modules can be implemented as single in-line memory module (SIMM), dual inline memory module (DIMM), and high bandwidth memory (HBM).

What is claimed is:

1. An arithmetic device comprising:
   a command decoder configured to receive an electrical signal including an external command and propagate the electrical signal through the command decoder to decode the external command and to generate output signals including a table set signal, an input selection signal, and a table input signal; and
   an activation function (AF) circuit including a first table storage circuit, configured to store the table input signal into one variable latch selected based on the input selection signal among variable latches included in the first table storage circuit in a look-up table form when the table set signal is activated, and configured to extract a result value of a first activation function realized by the look-up table based on an input distribution signal to output the extracted result value as a first table output signal for generating an output distribution signal,
   wherein the table input signal is an electrical signal that is received by the AF circuit and propagated through AF circuit and output from the AF circuit as the output distribution signal.

2. The arithmetic device of claim 1,
   wherein the first table storage circuit is configured to include a first variable latch and a second variable latch; and
   wherein the table input signal is inputted and stored into the first variable latch or the second variable latch according to the input selection signal.

3. The arithmetic device of claim 1, wherein the AF circuit further includes a second table storage circuit in which a second activation function used for a neural network is hardwired.

4. The arithmetic device of claim 3, wherein the second activation function is set as one of a sigmoid function, a hyperbolic tangent activation function (Tanh), a rectified linear unit function (ReLU), a leaky ReLU, and a max out activation function (Maxout).

5. The arithmetic device of claim 3, wherein the second table storage circuit is configured to extract a result value of the second activation function based on the input distribution signal to output the extracted result value as a second table output signal for generating the output distribution signal.

6. The arithmetic device of claim 5, wherein the AF circuit outputs one of the first table output signal and the second table output signal as the output distribution signal based on a function selection signal.

7. The arithmetic device of claim 6, wherein the function selection signal is stored into a mode register through a mode register set, and
   wherein the function selection signal is outputted from the mode register through a mode register read.

8. The arithmetic device of claim 1 further comprising a multiply-accumulate (MAC) circuit configured to perform a MAC arithmetic operation for generating the input distribution signal, wherein the MAC arithmetic operation includes a multiplying operation and an accumulating operation of vector data and weight data.

9. The arithmetic device of claim 8, wherein the vector data contains information about features contained in an input layer used for a neural network, and the weight data contains information about the influence on classifying features of the input layers as results contained in an output layers used for the neural network.

10. The arithmetic device of claim 8, wherein the MAC circuit receives the weight data from a data input/output circuit or a data storage circuit.

11. The arithmetic device of claim 8, wherein the MAC circuit receives the vector data from one of a data input/output circuit, a data storage circuit and the AF circuit.

12. An arithmetic device comprising:
   an external data decoder configured to receive an electrical signal including external data and propagate the electrical signal through the external data decoder to decode the external data to generate output signals including a table set signal, an input selection signal, and a table input signal; and
   an activation function (AF) circuit including a first table storage circuit, configured to store the table input signal into one variable latch selected based on the input selection signal among variable latches included in the first table storage circuit in a look-up table form when the table set signal is activated, and configured to extract a result value of a first activation function realized by the look-up table based on an input distribution signal to output the extracted result value as a first table output signal for generating an output distribution signal,
   wherein the table input signal is an electrical signal that is received by the AF circuit and propagated through AF circuit and output from the AF circuit as the output distribution signal.

13. The arithmetic device of claim 12 further comprising a multiply-accumulate (MAC) circuit configured to perform a MAC arithmetic operation for generating the input distribution signal, wherein the MAC arithmetic operation includes a multiplying operation and an accumulating operation of vector data and weight data.

14. The arithmetic device of claim 12, wherein the AF circuit further includes a second table storage circuit in which a second activation function used for a neural network is hardwired.

15. The arithmetic device of claim 14, wherein the second table storage circuit is configured to extract a result value of the second activation function based on the input distribution signal to output the extracted result value as a second table output signal for generating the output distribution signal.

16. The arithmetic device of claim 15, wherein the AF circuit outputs one of the first table output signal and the second table output signal as the output distribution signal based on a function selection signal.

17. The arithmetic device of claim 16, wherein the function selection signal is generated by decoding the external data.

18. An arithmetic device comprising:
- a mode register configured to store an electrical signal including a table set signal, an input selection signal, and a table input signal through a mode register set; and
- an activation function (AF) circuit including a first table storage circuit, configured to store the table input signal into one variable latch selected based on the input selection signal among variable latches included in the first table storage circuit in a look-up table form when the table set signal is activated, and configured to extract a result value of a first activation function realized by the look-up table based on an input distribution signal to output the extracted result value as a first table output signal for generating an output distribution signal, wherein the table input signal is an electrical signal that is received by the AF circuit and propagated through AF circuit and output from the AF circuit as the output distribution signal.

19. The arithmetic device of claim 18, wherein the AF circuit further includes a second table storage circuit in which a second activation function used for a neural network is hardwired; and wherein the second table storage circuit is configured to extract a result value of the second activation function based on the input distribution signal to output the extracted result value as a second table output signal for generating the output distribution signal.

20. The arithmetic device of claim 19, wherein the AF circuit outputs one of the first table output signal and the second table output signal as the output distribution signal based on a function selection signal; and wherein the function selection signal is stored into the mode register through the mode register set.

\* \* \* \* \*